(12) United States Patent
Del Sole et al.

(10) Patent No.: US 12,043,212 B1
(45) Date of Patent: Jul. 23, 2024

(54) ARTICULATING CARGO/LADDER RACK FOR TRUCKS AND VEHICLES

(71) Applicants: Robert Joseph Del Sole, Larchmont, NY (US); Robert Bahret MacDonald, Poughkeepsie, NY (US)

(72) Inventors: Robert Joseph Del Sole, Larchmont, NY (US); Robert Bahret MacDonald, Poughkeepsie, NY (US)

(*) Notice: Subject to any disclaimer, the term of this patent is extended or adjusted under 35 U.S.C. 154(b) by 460 days.

(21) Appl. No.: 17/199,501

(22) Filed: Mar. 12, 2021

Related U.S. Application Data

(60) Provisional application No. 63/102,166, filed on May 29, 2020.

(51) Int. Cl.
*B60R 9/04* (2006.01)
*B60R 3/00* (2006.01)

(52) U.S. Cl.
CPC .................................. *B60R 3/007* (2013.01)

(58) Field of Classification Search
CPC ... B60R 9/042; B60R 9/00; B60R 9/08; B60P 3/1025; B60P 3/122
See application file for complete search history.

(56) References Cited

U.S. PATENT DOCUMENTS

| | | | | |
|---|---|---|---|---|
| 3,972,433 A * | 8/1976 | Reed | ..................... | B60P 3/1025 224/310 |
| 5,584,521 A * | 12/1996 | Hathaway | ................ | B60J 7/104 296/36 |
| 6,676,220 B2 * | 1/2004 | Mistler | ..................... | B60P 1/28 298/1 A |
| 7,207,615 B2 * | 4/2007 | St. Romain | ............ | B62D 33/08 296/37.6 |
| 7,997,850 B2 * | 8/2011 | Hutchison | ................ | B60P 3/07 414/478 |
| 8,113,562 B2 * | 2/2012 | Skoglun | ................ | B62D 33/08 296/3 |
| 9,815,413 B2 * | 11/2017 | Rudnicki | ............. | B60P 3/1016 |
| 2011/0127790 A1 * | 6/2011 | Mokhtari | ................ | B60P 3/42 296/3 |
| 2017/0120833 A1 * | 5/2017 | Rudnicki | ............... | B60R 9/042 |

* cited by examiner

*Primary Examiner* — Corey N Skurdal
(74) *Attorney, Agent, or Firm* — Saile Ackerman LLC; Stephen B. Ackerman; Rosemary L. S. Pike

(57) ABSTRACT

An articulating cargo rack is disclosed, and provides for easier loading, securing, and unloading of cargo, such as building supplies, ladders, and the like. The articulating cargo rack includes a lower, frame subassembly, connected to an upper, rack subassembly pivotably connected to the frame subassembly. The rack subassembly is configured to move between a horizontal position and a slanted position, after the back end of the rack subassembly is moved with a downward and rearward motion. The slanted position facilitates easier loading of cargo on to the rack subassembly, after which it is moved back up into a horizontal and locked position. The frame subassembly is configured to be secured to the frame to a vehicle by, for example, clamps or bolts.

14 Claims, 5 Drawing Sheets

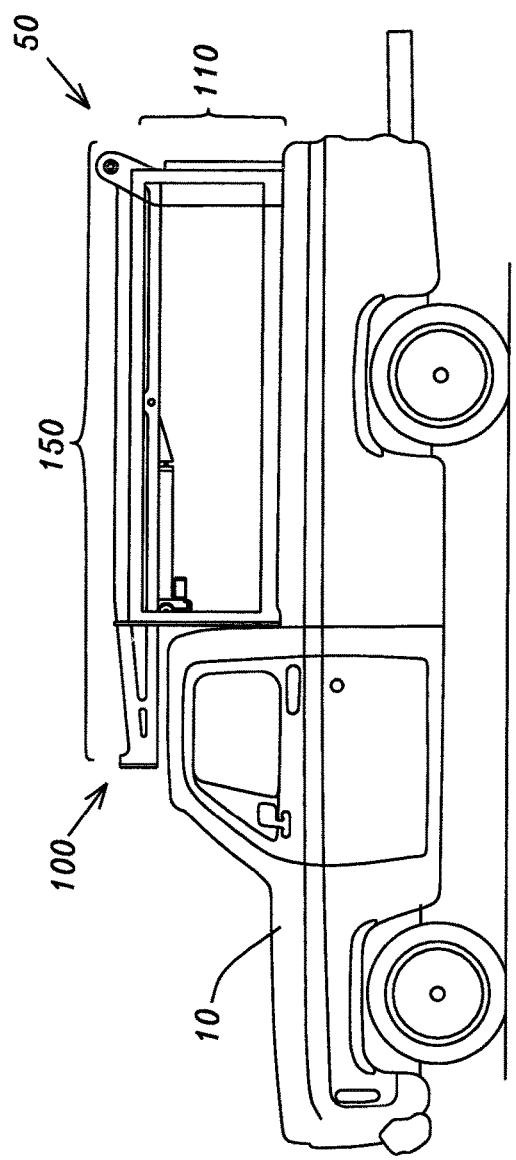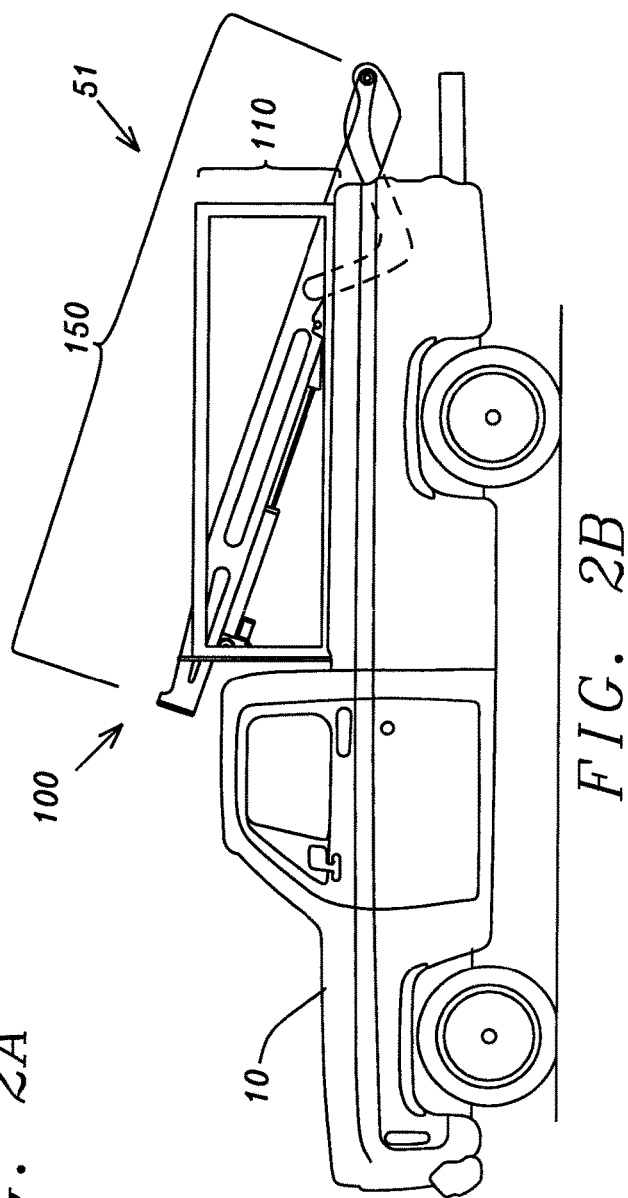

ARTICULATING CARGO/LADDER RACK FOR TRUCKS AND VEHICLES

This application claims benefit to U.S. Provisional Application 63/102,166, filed on May 29, 2020, which is herein incorporated by reference in its entirety.

TECHNICAL FIELD

This application relates to cargo racks for vehicles, and more specifically to an articulating cargo rack for pickup trucks.

BACKGROUND

Typical cargo racks, such as shown in FIG. 1, are in a fixed position with welded steel frames which attach to the side rails of a truck. This type of rack sits approximately six feet off the ground which requires the user to lift heavy materials over their head. This makes it difficult and dangerous to load, secure, and unload cargo, such as building supplies and ladders.

SUMMARY

It is an object of the present disclosure to provide a cargo rack which pivots down and slides back to ease cargo loading and unloading.

The above objects and others are achieved by an articulating cargo rack having a lower, frame subassembly, and an upper, rack subassembly pivotably connected to the frame subassembly, where the rack subassembly is configured to move between a horizontal position and a slanted position.

The cargo rack allows for easier loading, securing, and unloading of cargo. The articulating cargo rack includes a rectangular frame which runs the length of a truck bed, extends side to side, and extends upward approximately 20 inches from the top of the bed, and may be clamped or bolted to secure the frame to the truck bed. The rack preferably includes nylon wear pads attached to the frame where the rack slides through, and two rear arms that lower and extend the rack rearward during the downward slanting motion. A drive system, preferably comprising electrically operated actuators, converts applied force into actuation of the arms to move the cargo rack down and back toward the back of the truck bed, or up and forward toward the upright and locked position over the truck. An electronic system optionally produces an alarm sound when the cargo rack is in motion. An optional brake light is provided on the rear of the cargo rack, as well as work lights mounted on the front cross member of the frame to provide lighting within the truck bed and under the cargo rack. There are load securing mechanisms along the top sides of the cargo rack to assist in securing cargo in place, and removable bulkheads at the front and rear of the cargo rack to enable cargo to be loaded and transported which is longer than the cargo rack bed.

BRIEF DESCRIPTION OF THE DRAWINGS

In the accompanying drawings forming a material part of this description, there is shown:

FIG. 2A illustrates a side view of the upright position of the cargo rack of the preferred embodiment of the present disclosure.

FIG. 2B illustrates a side view of the lowered position of the preferred embodiment in FIG. 2A of the present disclosure.

DETAILED DESCRIPTION

Figure 1:
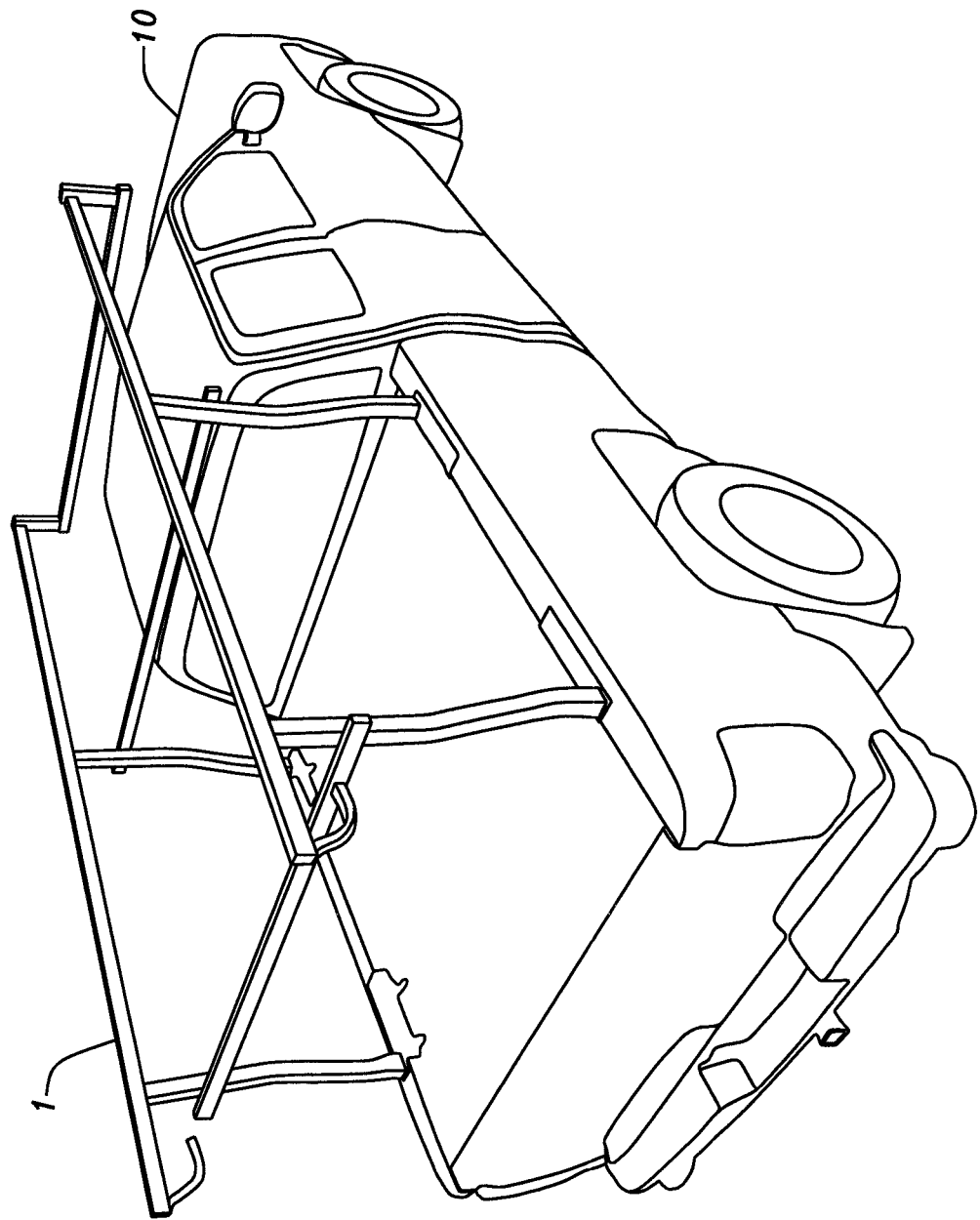
FIG. 1 illustrates a typical cargo rack of the prior art.

FIG. 2A is a perspective view of a preferred embodiment of the disclosed cargo rack assembly 100, in assembled form. The assembly 100 is comprised of two distinct subassemblies. The frame subassembly 110 secures the assembly to the truck 10 and is attached to the truck bed sides by, for example, clamps or bolts. The rack subassembly 150 holds the cargo and maneuvers between two positions, horizontally locked 50 as shown in FIG. 2A and angled down toward the truck tailgate 51 as shown in FIG. 2B, with movement driven by, preferably, electrically actuated linear actuators 125.

Figure 3:
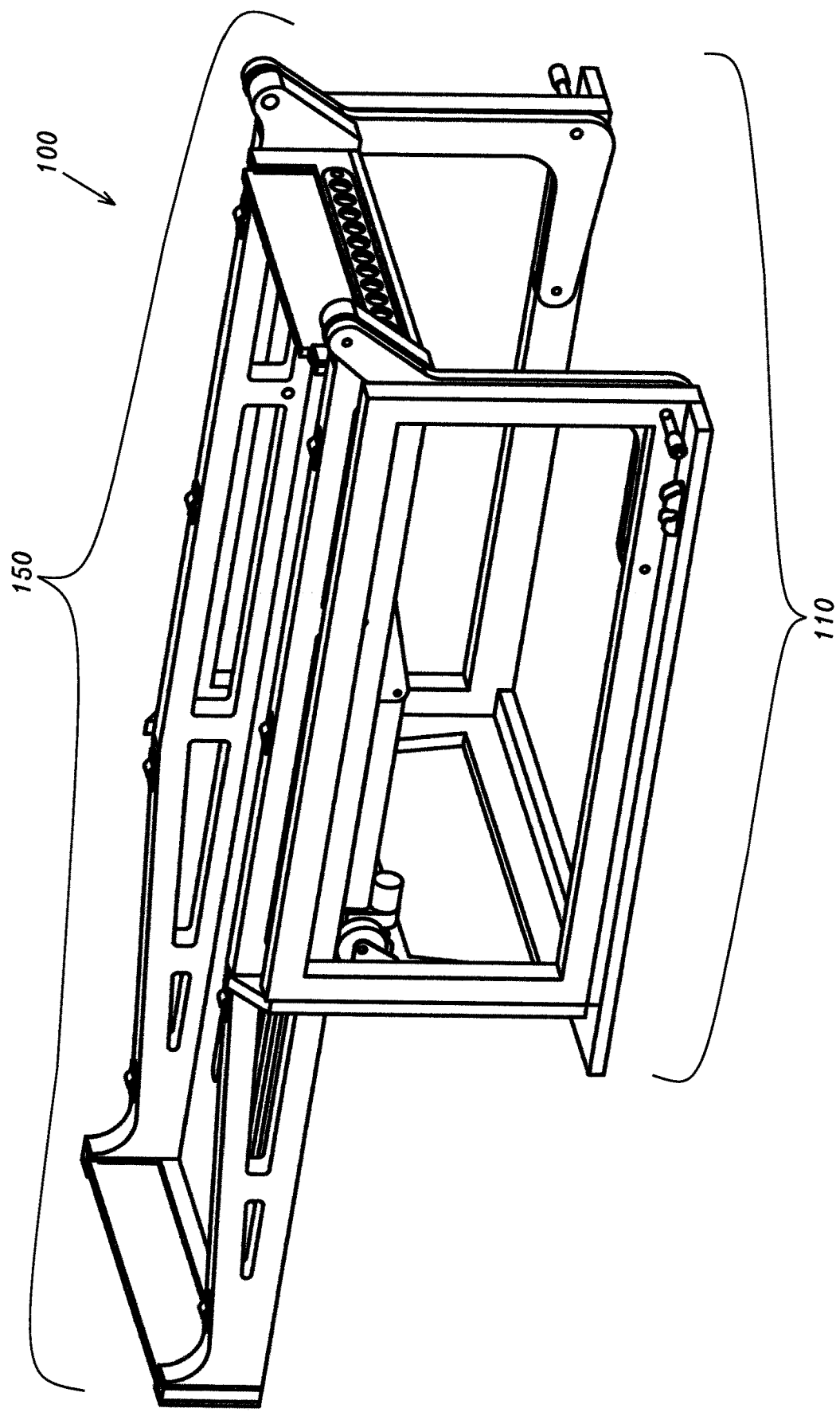
FIG. 3 illustrates a perspective view of the preferred embodiment of the cargo rack of the present disclosure.
Figure 4A:
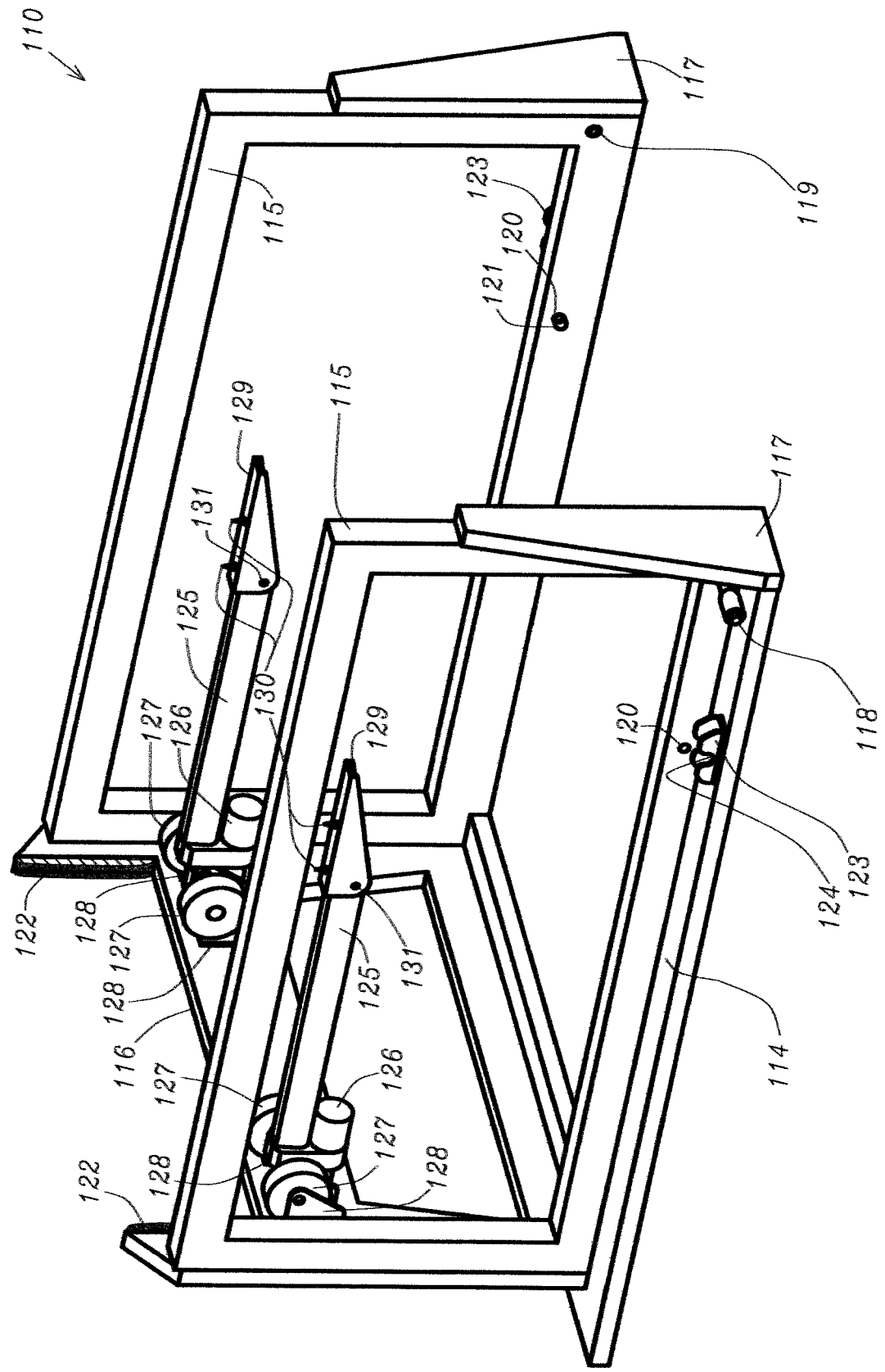
FIG. 4A illustrates a perspective view of the preferred embodiment of the frame subassembly of the cargo rack of the present disclosure.

FIG. 3 illustrates a perspective view of the preferred embodiment of the cargo rack of the present disclosure. FIG. 4A illustrates a perspective view of the preferred embodiment of the frame subassembly of the cargo rack of the present disclosure. A preferred embodiment of the frame subassembly 110 is comprised of two side frames 115, a front panel frame 116, and two back panel frames 117. Two quick release ball lock pins 118 (only one is shown in FIG. 4A) slide through holes 119 (only one is shown in FIG. 4A) in side frame 115 and through (see FIG. 4B) middle arm hole 174 of arm 171 to support the assembly 100 in its horizontal and locked position 50. These lock pins 118 take the load off the actuators 125 when in the horizontally locked position 51 and provide a positive lock for the assembly 100. Two holes 120 in side frame 115 hold the bolts 177 which slide through bottom arm holes 172 to connect arms 171 to the side frames 115. Two brackets 123 attach to skirt frame 114 via screws 124 and receive the pins 165 which are attached to the bed rails 153 when the assembly 100 is moved to the lowered position 51. The back end of the electric actuators 125 and motors 126 attach to the inside of the front panel 116, the rod end of the actuators 125 attach to brackets 129 via clevis pins 131 secured in place with cotter pins (not shown), and the brackets 129 attach to the bottom of the bed 152 via screws 130 such that when power is applied to the actuator motors 126 to extend the actuators 125, the rack subassembly 150 moves into the lowered position 51. Before the assembly 100 is lowered, the assembly 100 can be raised slightly with the actuators 125 by applying power to the actuator motors 126 to make the actuators 125 compress, freeing the lock pins 118 from holding the load so the pins 118 can be removed. When power to the actuator motors 126 is reversed and the actuators 125 compress, the rack subassembly 150 moves back up into the horizontal and locked position 50.

While the means by which the assembly 100 is made to move is preferably electric actuators, alternative approaches include air or hydraulic actuators, cables and a hand winch, or gears and chains.

As an added safety feature, when the assembly 100 is in motion an audible alarm sounds to warn the user of its movement.

Though more or less could be used, preferably four wheels 127, one on each side of each actuator 125, are mounted to brackets 128 which attach to the inside of front panel frame 116 via screws, not shown. The wheels 127 facilitate smooth motion of the assembly 100 when the rack subassembly 150 is moving. Two replaceable nylon wear pads 122 are secured in place with countersunk screws (not shown) to the top inside edges of front panel frame 116 and prevent same-material rubbing of the moving rack subassembly 150, thus decreasing wear and damage.

Optionally, two work lights 126 are mounted on the inside of the front frame 116 to illuminate the truck bed area under the assembly 100 for safety and convenience.

Figure 4B:
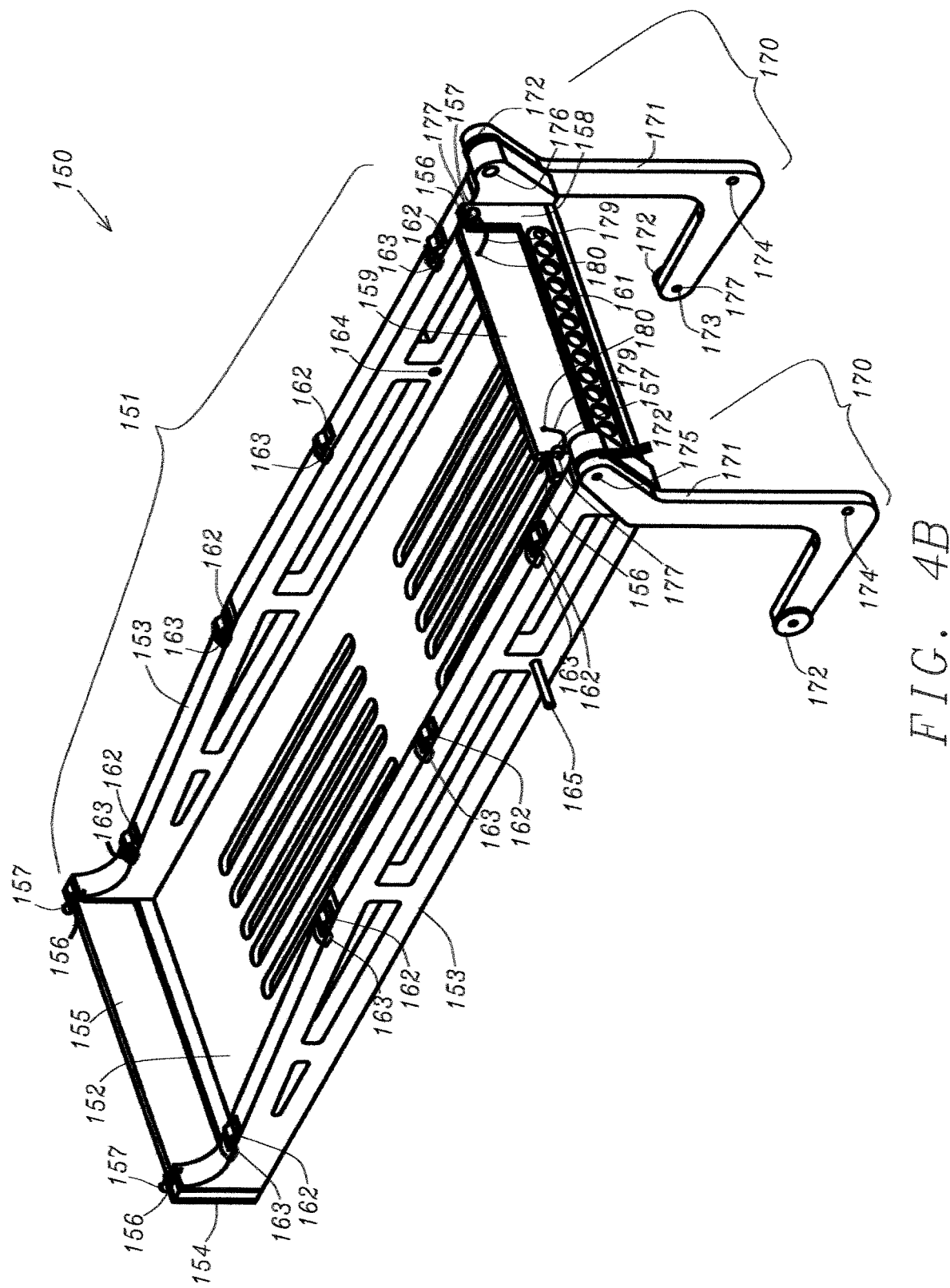
FIG. 4B illustrates a perspective view of the preferred embodiment of the articulating subassembly of the cargo rack of the present disclosure.

FIG. 4B illustrates a perspective view of the preferred embodiment of the articulating subassembly of the cargo rack of the present disclosure. The articulating subassembly 150 is comprised of a bed subassembly 151 and two arm subassemblies 170. The largest parts of the bed subassembly 151 are a horizontal bed 152 and two bed rails 153. There is also a front frame 154 and front bulkhead 155 which slots into vertical C brackets 156 which are screwed into the insides of front frame 154. The hair pin cotters 157 secure the front bulkhead 155 to the front frame 154 by sliding through holes 177 in front bulkhead 155 and front frame 154 and applying pressure on top. Similarly, there is a back frame 158 and back bulkhead 159 which slots into vertical C brackets 156 which are screwed into the insides of back frame 158. Hair pin cotters 157 connect via cables 179 which is connected via screws 180 into the back bulkhead 159. The hair pin cotters 157 secure the back bulkhead 159 to back frame 158 by sliding through holes 177 in back bulkhead 159 and back frame 158 and applying pressure on top. The front bulkhead 155 can be replaced with a bulkhead that holds a retractable mesh or net on a roller assembly that can be pulled out the length of the assembly 100 to cover and secure smaller items. When no longer needed the cover can be retracted back into the roller assembly and stored away. The back bulkhead 159 and front bulkhead 155 can be removed to allow for longer items to be held on the bed 152.

A light strip 161 is optionally embedded in back frame 158 to provide an added reflective surface to drivers at night trailing a vehicle holding the disclosed cargo rack. A back strip of lights ensures that the user's vehicle will comply with the US National Highway Traffic Safety Administration regulations for vehicles to have a third brake light. Presently ladder and cargo racks when loaded may inhibit visibility of the third brake light mounted to the cab of the vehicle.

There are a plurality of brackets 162 attached to the top of side bed rails 153 with metal loops 163 for tying down cargo. There are also holes 164 in side bed rails 153 which secure pins 165 which move into brackets 123 of frame subassembly 110 when the assembly 100 is moved into the lowered position 51. These pins 165 take the load off the actuators 125 and stabilize the assembly 100 when it is in the lowered position 51.

The arm subassembly 170 includes two arms 171, four circular nylon wear pads 172 which attach between the top of the arms 171 and the rails 153 and between the bottom of the arms 171 and the side frames 115 of the frame subassembly 110. The arms 171 are designed to give maximum access to the truck bed when the assembly 100 is in its raised position 50. There are three holes in the arm 171, a bottom hole 173 which attaches the arm 171 to round wear pad 172 and to the side frame 115 via bolt 121, a middle hole 174 which lock pin 118 slides through and into side frame 115 to take the load of the assembly 100 off the actuators 125 when it is in the upright and locked position 50, and an upper hole 175 which attaches the arm 171 to round wear pad 172 and to the bed rail 153 via bolt 176.

Arms 171 are an important feature of the disclosure. As shown, the arms are preferably L-shaped with a diagonal offset at the upper end. This shape allows maximum access to the truck bed area when the assembly 100 is in the horizontal and locked position 50. The L-shaped arms and pivot points shown allow the assembly 100 to achieve its maximum extension and tilt without bottoming out on the truck bed floor. They also allow for easy loading (when the assembly is in the upper, horizontal, position) of cargo in the truck bed, from the side, and minimize actuator length.

Actuators 125 are preferably electrically operated by, for example, low DC voltage available from the vehicle itself. Alternately the disclosed cargo rack 100 could have its own power source, such as a rechargeable battery to provide, for example, 12 volts DC. Control of operation is by either a switch located at the rear of the assembly 100, or alternately by remote control similar to a vehicle key fob. Preferably the switch consists of two buttons, one to move the rack subassembly 150 forward, and one to move the rack subassembly 150 back.

The cargo rack of the disclosure has several advantages, due to its ability to pivot downward and rearward toward the tailgate of the truck, thus allowing easier and safer loading and unloading for the user. Additionally, the back strip of lights ensures that the user's vehicle will comply with the US National Highway Traffic Safety Administration regulations for vehicles to have a third brake light.

A preferred embodiment utilizes two arms in conjunction with two electric actuators and four freely rotatable wheels to facilitate motion of the rack subassembly. The wheels provide a secure base to bear the weight of the front end of the assembly.

Locking in the upper, horizontal position may be enhanced by a positive lock (not shown) attached to the lower side of the rack subassembly 150 and which aligns with a mating lock on the front panel frame 116, which further prevents bouncing of the rack subassembly and attached cargo during vehicle motion.

A further alternative is to use two front arms instead of four rollers. These front arms would attach to the front corner of the frame, in line with the rear arms, and to the rails toward the front of the truck, in line with the rear arms. The front arms are straight instead of L-shaped with a diagonal offset. The arms are vertical when the rack is in its raised position, and pivot to an angled position as the rack is moved.

A further embodiment utilizes cables and a hand winch (not shown), rather than actuators, to move the assembly. The winch would attach toward the rear of the side frame and a cable would be attached by a series of pulleys to the bed side rails toward the back of the assembly. The operator could lower and raise the cargo rack using the winch which has a built in brake to control the speed.

An optional feature of the cargo rack is a pair of springs similar to those used on a garage door. The springs would attach to the underside of the rack bed and to the front panel. These springs would aid in lifting the rack up and would act as a failsafe if the actuators extend accidentally.

The disclosed cargo rack can be made of, for example, steel, aluminum, wood, or plastic, as long as the material chosen has sufficient strength and durability for anticipated loads that would be carried by the cargo rack 100.

Although the preferred embodiment of the present disclosure has been illustrated, and that form has been described in detail, it will be readily understood by those skilled in the art that various modifications may be made therein without departing from the spirit of the disclosure or from the scope of the appended claims.

What is claimed is:

1. An articulating cargo rack, comprising:
a lower, frame subassembly;
an upper, rack subassembly pivotably connected at its front end to the frame subassembly by brackets;
a pair of arms pivotably connected to the frame subassembly and to a back end of the rack subassembly; and
one or more wheels connected to said frame subassembly, in contact with said rack subassembly and which are configured to rotate during movement of the rack subassembly, wherein said rack subassembly is configured to move between a horizontal position and a downwardly slanted position pivoting at said brackets and at said arms.

2. The articulating cargo rack of claim 1, further comprising electrically operated actuators for moving said cargo rack between said horizontal and slanted positions.

3. The articulating cargo rack of claim 1, wherein actuators are attached to said frame subassembly and under said rack subassembly.

4. The articulating cargo rack of claim 1, further comprising removeable bulkheads on the front and the back of the rack subassembly.

5. The articulating cargo rack of claim 1, further comprising a pin on each side of said rack subassembly, and a bracket on each side of said frame subassembly, wherein each said pin engages with one of said brackets when said rack subassembly is in said slanted position.

6. The articulating cargo rack of claim 1, further comprising tie-downs along side arms of the rack subassembly.

7. The articulating cargo rack of claim 1, further comprising a rear brake light.

8. The articulating cargo rack of claim 1, wherein in the slanted position the rack subassembly extends rearward from its original position, relative to the frame subassembly.

9. The articulating cargo rack of claim 1, wherein the frame subassembly fits in, on, or around a pickup-truck bed.

10. The articulating cargo rack of claim 1, further comprising work lights configured to illuminate an area under the rack subassembly.

11. The articulating cargo rack of claim 1, further comprising locking pins to stabilize the rack subassembly and take stress off the actuators when the rack subassembly is in the horizontal position, inserted through both of said frame and rack subassemblies.

12. The articulating cargo rack of claim 1, further comprising a drive system comprising one or multiple hydraulic or pneumatic actuators.

13. The articulating cargo rack of claim 1, wherein said arms are L-shaped.

14. The articulating cargo rack of claim 1, further comprising electrically operated actuators for moving said cargo rack between said horizontal and slanted positions, wherein said one or more wheels connected to said frame subassembly are adjacent to said electrically operated actuators.

* * * * *